(No Model.)

H. T. HAIGHT.
MILK CAN.

No. 249,174. Patented Nov. 8, 1881.

Witnesses:
F. B. Townsend
F. W. Haschagen

Inventor:
Hiram T. Haight,
By Lotz & Dyer,
Attys.

UNITED STATES PATENT OFFICE.

HIRAM T. HAIGHT, OF CHICAGO, ILLINOIS, ASSIGNOR TO CRAGIN BROTHERS & CHANDLER, OF SAME PLACE.

MILK-CAN.

SPECIFICATION forming part of Letters Patent No. 249,174, dated November 8, 1881.

Application filed April 2, 1881. (No model.)

*To all whom it may concern:*

Be it known that I, HIRAM T. HAIGHT, of Chicago, in the county of Cook and State of Illinois, have invented a certain new and useful Improvement in Milk-Cans, of which the following is a specification.

The object I have in view is to produce a milk-can with its cover or stopper so secured in position that it will not be forced from place by the upsetting of the can or allow the milk to run from the can under such conditions; will permit the can to be rolled on its sides, if desired, in handling; will prevent the slopping of the milk around the sides of such cover or stopper and the freezing of the cover fast, so that it cannot be removed in cold weather; and will, further, be adapted to accomplish these objects and still be capable of easy removal.

My object is, further, to provide such a cover with a lock, so that the cover cannot be removed and the milk extracted except by a person having a suitable key or knowing the method of working the lock.

My invention therein consists in the peculiar devices employed by me to accomplish the foregoing objects, as fully hereinafter explained, and pointed out by the claim.

Figure 1:
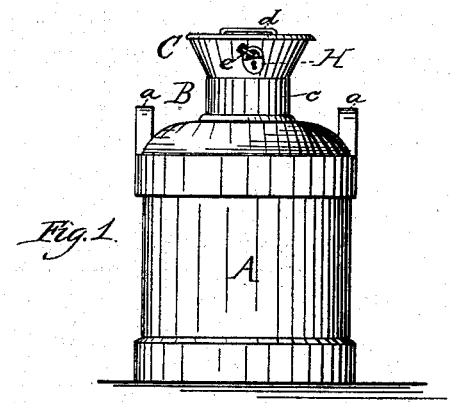
Figure 2:
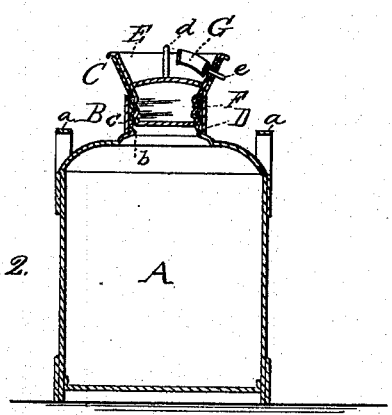
Figures 3, 4:
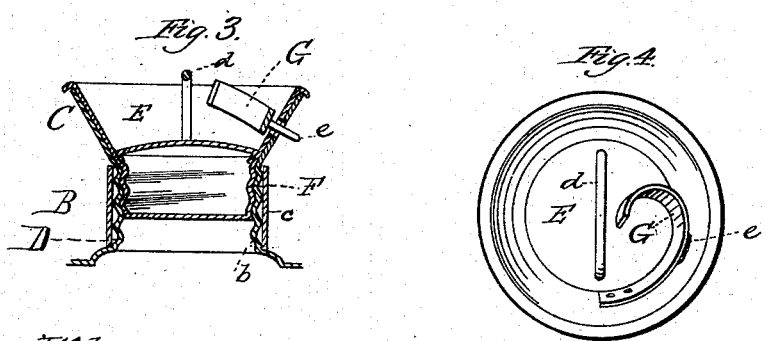

In the accompanying drawings, forming a part hereof, Figure 1 is an elevation of the milk-can; Fig. 2, a central vertical section of the same; Fig. 3, a vertical section through the cover or stopper and the mouth and neck of the can on a larger scale, and Fig. 4 a top view of the cover.

Like letters denote corresponding parts in all four figures.

A is the body of the milk-can, which is of the ordinary or any suitable construction. Its handles *a* are set back far enough so that the can may be rolled on its side, if desired.

B is the neck of the can, and C the flaring mouth of the same. The neck B of the can has a complete or partial screw-thread, rib, or groove, D, which is preferably made by pressing or stamping the tin strip *b* from which the walls of the neck are formed previous to soldering it in cylindrical shape. The strip *b* is preferably surrounded by a smooth outside strip, *c*; but this extra strip may be omitted, if desired.

E is the cover or stopper which fits the neck and mouth of the can, and has the usual handle, *d*. The lower part of this cover is provided with a screw-thread, F, pressed in its walls, which engages with the screw-thread D of the neck B. When the cover is screwed down tight to its place it will not be forced off by the upsetting of the can, will prevent the slopping of the milk up into the mouth and the consequent freezing of the cover, so that it cannot be removed, and will allow the can to be rolled on its side.

To prevent the possibility of the cover working loose under any circumstances, I provide it with a leaf-spring, G, which has a catch, *e*, projecting through a hole in the side of the cover, and engaging, when the cover is screwed down tight, with a hole in the mouth of the can. The spring G has a curved end, by which it is pulled back to withdraw the catch from its locking-hole at the same time that the handle *d* of the cover is grasped.

As a means of locking the cover to prevent the stealing of the milk, the catch *e* is made in the form of a staple, and through it is passed the hasp of a padlock, H, or any other suitable lock. This lock does not interfere with the handling of the can, and can be removed or placed on the same at any time.

Instead of securing the cover by means of screw-threads on the cover and neck, the neck may be provided with two inclined ribs, with which will engage two studs on the cover; or the parts can be reversed and the cover provided with the inclined ribs and the neck with the studs. This construction I consider the equivalent of the screw-threads.

What I claim as my invention is—

The combination of the can A, having a screw-threaded neck, B, and flaring mouth C, with the screw-threaded cover or stopper E, having spring G, with staple *e*, projecting through a hole in the flaring mouth of the can, and adapted to be secured by a padlock, all constructed and arranged substantially as described and shown.

This specification signed and witnessed this 26th day of March, 1881.

HIRAM T. HAIGHT.

Witnesses:
F. W. KASEHAGEN,
OLIVER W. MARBLE.